United States Patent [19]

Nagel

[11] Patent Number: 4,620,601

[45] Date of Patent: Nov. 4, 1986

[54] WELL DRILLING TOOL WITH DIAMOND THRUST BEARINGS

[75] Inventor: Dave D. Nagel, Houston, Tex.

[73] Assignee: Maurer Engineering Inc., Houston, Tex.

[21] Appl. No.: 306,290

[22] Filed: Sep. 28, 1981

[51] Int. Cl.[4] ............................................. E21B 4/02
[52] U.S. Cl. .................................... 175/107; 384/303; 384/282; 415/502
[58] Field of Search .............. 175/107, 101, 329, 330, 175/322; 384/303, 95, 420, 282–285; 308/DIG. 8; 415/502

[56] References Cited

U.S. PATENT DOCUMENTS

| T102,901 | 4/1983 | Offenbacher | 308/DIG. 8 |
|---|---|---|---|
| 1,063,982 | 6/1913 | Larnce | 175/412 |
| 1,792,719 | 2/1931 | White | 384/303 |
| 2,431,430 | 11/1947 | Shaw | 384/285 |
| 2,785,022 | 3/1957 | Lakey | 384/303 |
| 2,991,837 | 7/1961 | Postlewaite | 175/107 |
| 3,149,685 | 9/1964 | Mitchell et al. | 175/107 |
| 3,389,761 | 6/1968 | Ott | 175/410 |
| 4,077,734 | 3/1978 | Kita | 175/410 |
| 4,114,702 | 9/1978 | Maurer et al. | 175/107 |
| 4,190,301 | 2/1980 | Lachonius et al. | 175/329 |
| 4,345,798 | 8/1982 | Cortes | 308/160 |
| 4,410,054 | 10/1983 | Nagel et al. | 175/107 |
| 4,560,014 | 12/1985 | Geezy | 175/107 |

FOREIGN PATENT DOCUMENTS

| 578318 | 6/1946 | United Kingdom | 308/239 |
|---|---|---|---|
| 2059481 | 4/1981 | United Kingdom | 175/107 |

Primary Examiner—James A. Leppink
Assistant Examiner—Hoang C. Dang
Attorney, Agent, or Firm—Neal J. Mosely

[57] ABSTRACT

A turbodrill is disclosed which is connected to a string of drill pipe as a rotating shaft for driving a drill bit which may be a rotary bit or a high speed solid head diamond bit. The turbine section of the turbodrill has rotor and stator blades which are cresent shaped in cross section and are operated by drilling mud flowing therethrough to rotate the shaft. The shaft is provided with radial bearings which carry radial loads and thrust bearings which carry vertical or longitudinal loads. The thrust bearings, which carry the entire thrust load, consist of a pair of annular bearing plates each of which supports a plurality of friction bearing members, highly resistant to wear by the drilling mud flowing through the drill, consisting of cylindrical studs having flat faces with flat disc-shaped diamond bearing members supported thereon. There are preferably one more of the diamond bearing members on one of the annular bearing plates than on the other. This bearing arrangement can be used with sealed or unsealed constructions, since the bearings are lubricated by the flow of mud therethrough. The diamond bearings may be used with other types of downhole motor driven drills such as drills driven by positive displacement motors, and for other applications.

18 Claims, 10 Drawing Figures

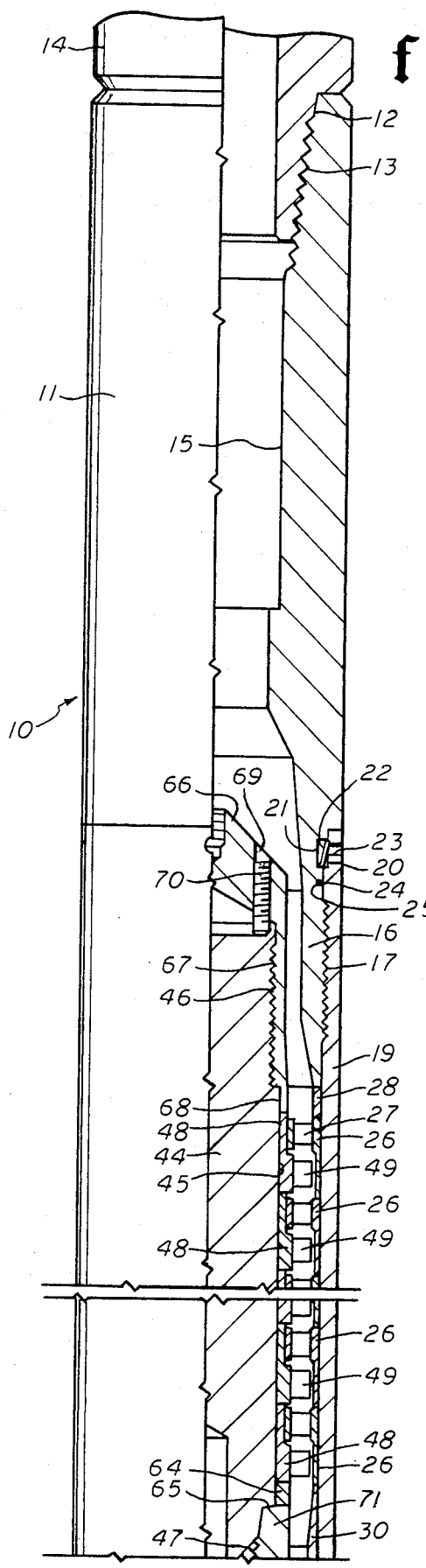
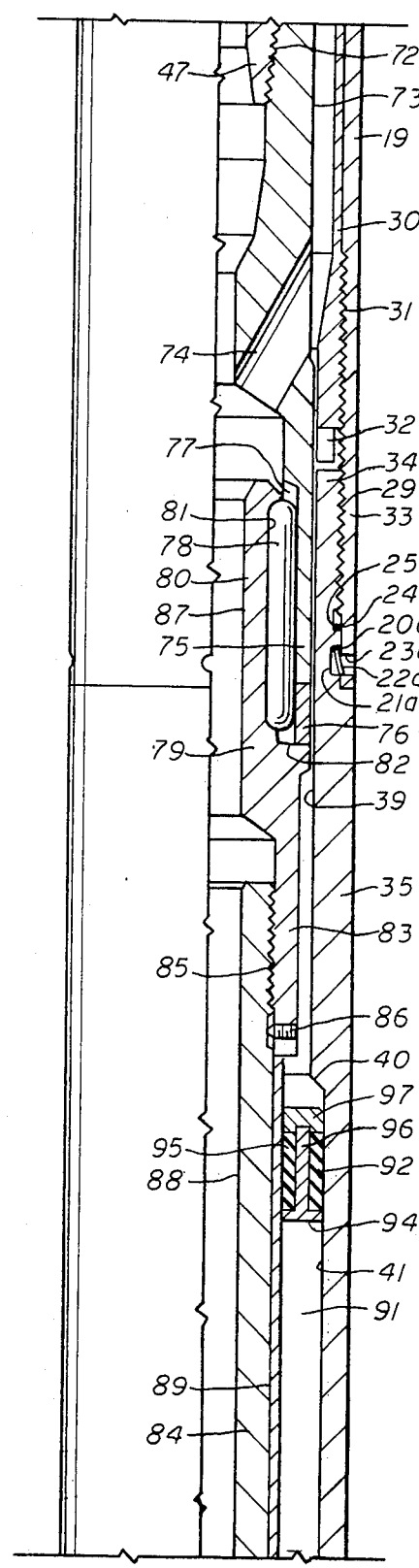

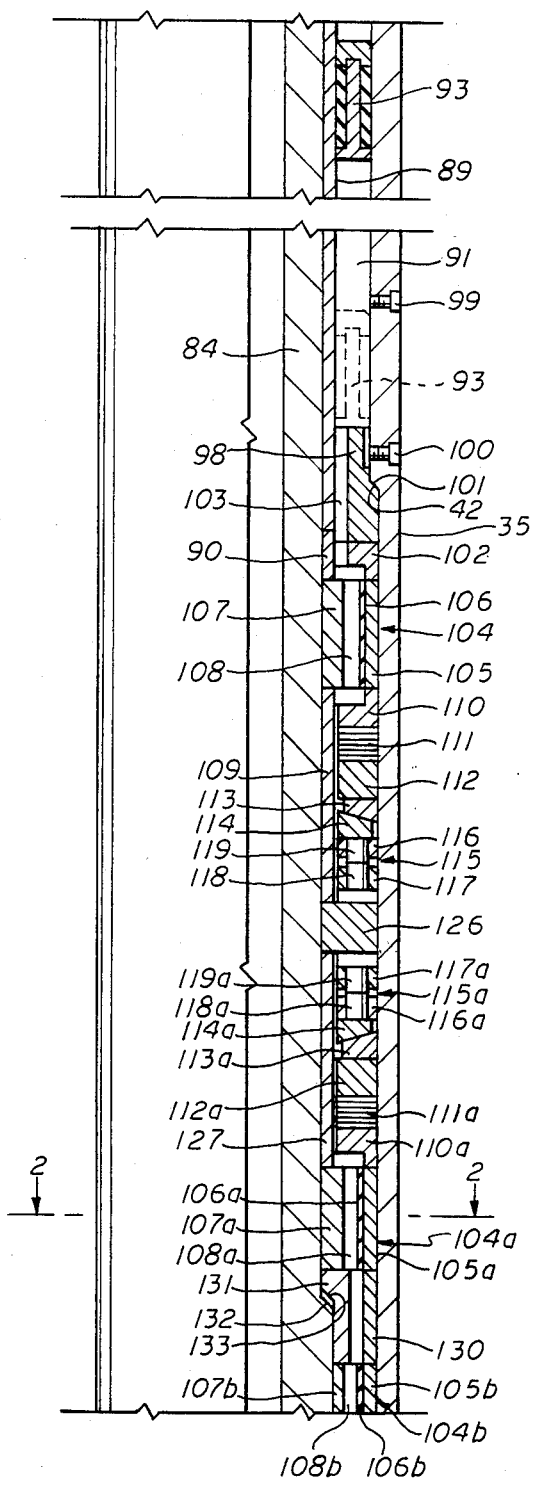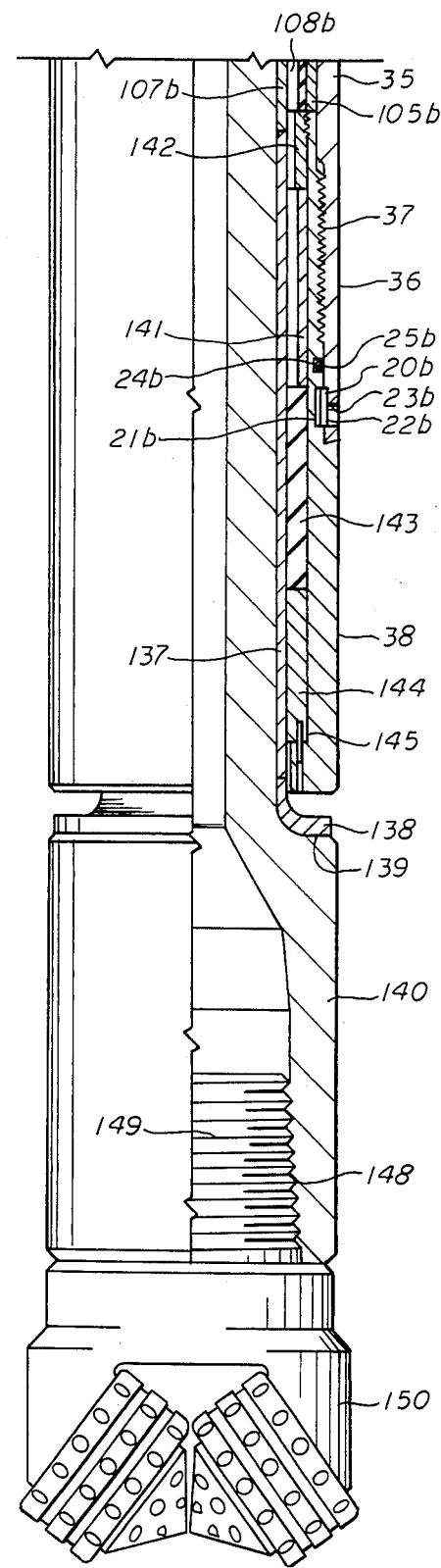

WELL DRILLING TOOL WITH DIAMOND THRUST BEARINGS

BACKGROUND OF THE INVENTION

1. Field of the Invention

This invention relates to down-hole drilling motors, such as turbodrills and drills operated by positive displacement motors, and more particularly to improved bearings used therein.

2. Brief Description of the Prior Art

Down-hole drilling motors were first invented 100 years ago. Down-hole drilling motors were first extensively tested in the 1920's. They did not find wide spread use until the 1950's when turbodrills began to be used in the Soviet Union. By the early 1960's, it is estimated that 85% of the wells in the Soviet Union were being drilled with turbodrills. Down-hole drilling motors have found widespread use in the United States for drilling directional holes, but they are not widely used for straight hole drilling because of bearing and seal problems.

Commerical down-hole drilling motors operate most effectively at speeds of 50 to 150 rpm. At high motor speeds, roller bearings fail after periods of about 5 to 15 hours whereas with conventional drilling equipment operating at lower speeds the bearings of roller bit last up to 200 hours. Down-hole motors have had substantial problems in design of radial and vertical thrust bearings, lubrication systems, turbine efficiency, housing construction, etc., which have limited substantially the acceptability of down-hole motros in petroleum drilling and in other applications.

Down-hole drilling motors were patented soon after the element of rotary drilling rigs in the 1860's.

Cross U.S. Pat. No. 174,922 discloses a very primitive turbodrill.

Baker U.S. Pat. No. 292,888 dicloses a single stage axial flow turbodrill which is similar in some respects to modern turbodrills.

Scharpenberg U.S. Pat. No. 2,482,702 discloses one of the earliest multi-stage turbodrills which was the forerunner of turbodrills currently in use. The Scharpenberg turbodrill contained a lubrication system which allowed the thrust bearing to operate in oil or grease. Drilling fluid acting on a floating piston pressurized the lubricant in the system. The bearing in modern turbodrills operate directly in the abrasive driling mud, resulting in rapid failures, which limit the application of these drills.

Capeliuschnicoff U.S. Pat. No. 1,681,094 dicloses a single staged geared turbodrill. These turbodrills were tested extensively in the Soviet Union from 1924 to 1934. The Russians had severe problems with the speed reducers Capeliuschnicoff turbodrill and subsequently changed to the Scharpenberg turbodrill. Several Russian engineers perfected multi-stage turbodrills during the 1940's and 1950's and by the early 1960's, the Russians were drilling 80 to 90% of their wells with axial flow turbodrills. The Russians licensed turbodrill technology to companies in the United States, France, Germany and Austria. Turbodrills have had a rather limited commerical acceptance and are used primarily in directional wells.

Virtually all down-hole drilling motors have four basic components;
1. Motor section
2. Vertical thrust bearings
3. Radial bearings
4. Rotary seal.

The bearings and seals can be placed in a separate package or unit at the motor section and thus can be used on any type of motor (i.e. turbodrills, positive displacement motors, etc.)

There are two basic types of down-hole drilling motors:
1. Turbodrills
2. Positive displacement Turbodrills utilize the momentum change of drilling fluid (i.e. mud) passing through the curved turbine blades to provide torque to turn the bit. Diamond bits are used on most turbodrills because these motor turn at speed of 600 to 1,000 rpm whereas roller-type rock bits operate effectively only at speeds up to about 150 rpm. Positive displacement motors have fixed volumetric displacement and their speed is directly proportional to the flow rate. There are three basic types of positive displacement motors in use or currently under development:
1. Moineau motors
2. Flexing vane motors
3. Sliding vane motors These motors have large volumetric displacement and therefor deliver higher torques at lower speeds.

Thrust bearing failure in down-hole motors is a problem because of high dynamic leads produced by the action of the bits and by drill string vibrations. One major oil company placed a recorder at the hole bottom and found that dynamic loads were often 50% higher than the applied bit weight. It was found on occasion that the bit bounced off bottom and produced loads in excess of 120,000 pounds when drilling at an applied bit weight of 40,000 pounds. These high loads can cause rapid failure of the thrust bearings; consequently these bearings must be greatly over designed to operate in the hostile down-hole environment.

Two types of bearing have been used in down-hole drilling motors:
1. Rubber friction bearings
2. Ball or roller bearings In existing motors, these bearings operate directly in the abrasive drilling mud and usually wear out in 20 to 100 hours. In addition, the rubber friction bearings have high friction and therefore absore 30 to 40% of the output torque of the turbodrills. The lift of the vertical thrust bearings can be increased by operating at bit weights which nearly balance the hydraulic down thrust thereby removing most of the load from these bearings.

Radial bearings are required on each side of drilling motors and on each side of the vertical thrust bearings. These radial bearings are usually subjected to lower loads than the thrust bearings and therefore have much longer life. Two basic types of radial bearings are used in down-hole motors:
1. Marine bearings
2. Roller or ball bearings Most motors contain marine bearings made of brass, rubber or similar bearing materials. The marine bearings are cooled by circulated mud through them.

In the commonly assigned U.S. Pat. Nos. 4,114,702; 4,114,703 and 4,114,704 an improved turbodrill is disclosed which utilizes roller bearings both for radial bearings and longitudinal thrust bearings.

It is well known to use diamond bits for earth drilling using natural or synthetic diamonds bonded to supporting metallic or carbide studs or slugs. There are several types of diamond bits known to the drilling industry. In one type, the diamonds are a very small size and randomly distributed in a supporting matrix. Another type contains diamonds of a larger size positioned on the surface of a drill shank in a predetermined pattern. Still another type involves the use of a cutter formed of a polycrystalline diamond supported on a sintered carbide support.

Some of the most recent publications dealing with diamond bits of advanced design are Rowley, et al. U.S. Pat. No. 4,073,354 and Rohde, et al. U.S. Pat. No. 4,098,363. An example of cutting inserts using polycrystalline diamond cutters and an illustration of a drill bit using such cutters, is found in Daniels, et al. U.S. Pat. No. 4,156,329.

The most comprehensive treatment of this subject in the literture is probably the chapter entitled STRATA-PAX bits, pages 541-591 in ADVANCED DRILLING TECHNIQUES, by William C. Maurer, The Petroleum Publishing Company, 1421 South Sheridan Road, P. O. Box 1260, Tulsa, Okla. 74101, published in 1980. This reference illustrates and discusses in detail the development of the STRATAPAX diamond cutting elements by General Electric and gives several examples of commercial drill bits and prototypes using such cutting elements.

Polycrystalline diamond inserts have had extensive treatment in the literature as cutting elements for drill bits but there has been no suggestion of the use or application of diamond elements for friction bearings and particularly for bearings in turbodrills where the conditions of load and wear are severe.

Rotary seals are currently the weakest link in downhole motor design. Improved seals, particularly in combination with improved bearing designs, would allow the bearings to be sealed in lubricant, thereby increasing their life substantially. Improved seals would allow bits to be operated at higher pressures thereby greatly increasing drilling rate.

There are six basic types of seals that have been tested in down-hole motors:
1. Packing seals
2. Face seals
3. Labyrinth seals
4. Radial lip seals
5. Constrictions (friction bearings and marine bearings)
6. Flow metering seals Existing drilling motors allow drilling mud to continuously leak through the rotary seals by constricting the flow with any of a variety of seals permitting leakage. Sand and other abrasive particles are filtered out of the mud in the rotary seals which results in rapid failure of the seals. Any substantial improvement in turbodrill design will require positive seals which allow no appreciable leakage.

SUMMARY OF THE INVENTION

This invention is an improved down-hole well drilling tool having improved long-lasting bearings. These bearings are particularly useful in turbodrills and in drills operted by positive displacement motors. This down-hole well drilling tool is connected at one end to the lower end of a drill string and at the other end to the drill bit to be driven thereby.

The drilling tool comprises a tubular housing having a rotary shaft supported therein and extending therefrom to support a rotary drill bit. The housing includes a suitable motor means, i.e. tubine, positive displacement motor, etc., actuated by flow of drilling fluid (i.e. drilling mud) therethrough and operable to rotate the shaft to rotate the drill bit.

The shaft is provided with radial bearings which carry radial loads and thrust bearings which carry vertical or longitudinal loads. The thrust bearings consist of a pair of annular bearing plates, each of which supports a plurality of friction bearing members having bearing faces of polycrystalline diamond. The entire thrust load is carried by the diamond bearing surfaces which are highly resistant to wear by the drilling mud flowing through the drill. The bearing members are preferably cylindrical studs having flat faces with flat disc-shaped diamond bearing members supported thereon. There are preferably one more of the diamond bearing members on one of the annular bearing plates than on the other.

This bearing arrangement can be used with sealed or unsealed constructions, since the bearings are lubricated by the flow of mud therethrough. The diamond bearings may be used with other types of downhole motor driven drills such as drills driven by positive displacement motors, and for other applications.

BRIEF DESCRIPTION OF THE DRAWINGS

FIGS. 1A-1D are continuations of each other and are a view in longitudinal section (quarter section) of a turbodrill, in four successive parts viz., FIGS. 1A, 1B, 1C and 1D, substantially as shown in U.S. Pat. Nos. 4,114,702; 4,114,703 and 4,114,704, modified to include an improved polycrystalline diamond thrust bearing.

FIG. 1A is a view of the uppermost portion of a turbodrill, partly in elevation and partly in vertical section and further broken vertically to reduce the length of the turbine section.

FIG. 1B is a view partly in elevation and partly in vertical section of the next successive lower portion of the turbodrill and illustrating an improved turbine seal.

FIG. 1C is a view of the next lower portion of the turbodrill partly in section and illustrating an improved seal and an improved diamond bearing arrangement therein.

FIG. 1D is a view of the turbodrill partly in elevation and partly in vertical section showing the bottommost portion of the drill including the connection from the drill motor to the drill bit.

DESCRIPTION OF THE PERFERRED EMBODIMENT

Figure 2:
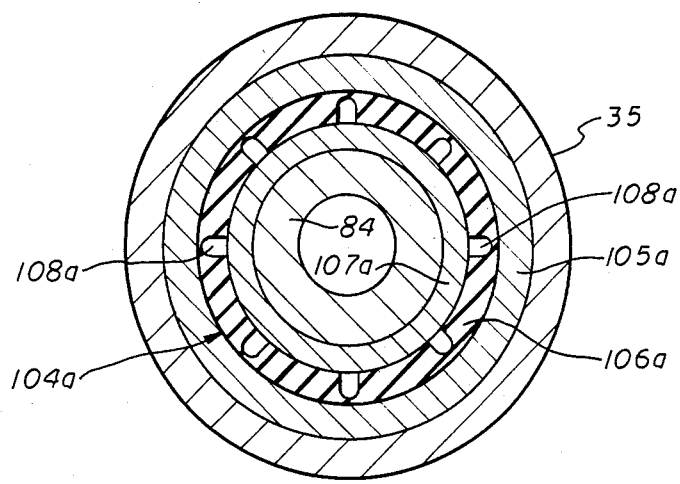
FIG. 2 is a sectional view, on the section line 2—2 of FIG. 1C, showing the radial bearing.
Figure 3:
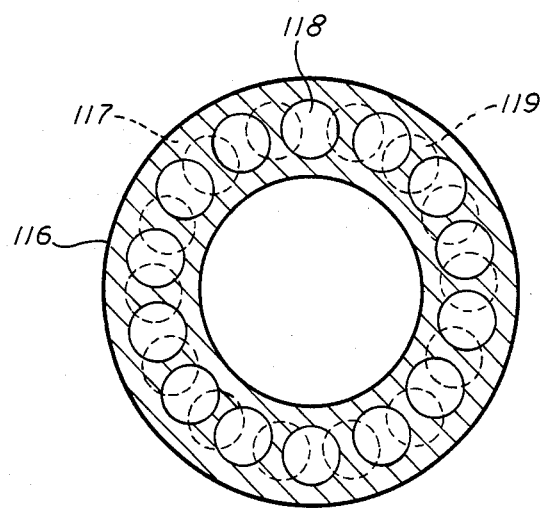
FIG. 3 is a plan view of the diamond bearings shown in FIG. 1C.

Referring to the drawings by numerals of reference and more particularly to FIGS. 1A to 1D, inclusive, there is shown a turbodrill which is generally designated 10. Turbodrill 10 is very long in relation to its width and requires FIGS. 1A, 1B, 1C and 1D to show its entire structure even though a substantial portion of the turbine section is omitted in FIG. 1A. A typical turbodrill of this design which is 7¾ inches in diameter is about 20.5 feet long. The turbine section represents almost half the length of the turbodrill and it is therefore necessary to omit a large portion of the multi-stage turbine.

At the upper end of the turbodrill 10 there is provided a stator housing sub 11 having a threaded box end portion 12 forming a threaded connection 13 with the lower end of a drill string 14. Stator housing sub 11 has an internal longitudinal passage 15 communicating with the open end of drill string 14.

Stator housing sub 11 has a threaded pin portion 16 which is threadedly connected as at 17 in the box end portion 18 of the stator housing 19. Stator housing box portion 18 has an internal annular groove 20 therein which mates, when assembled, with an annular grove 21 in the pin portion 16 of stator housing sub 11. A lock ring 22 extends peripherally around the turbodrill in the annular space provided by matching grooves 20 and 21 and abuts the walls of said grooves to prevent disassembly of said stator housing from said stator housing sub accidentally.

Figure 6:
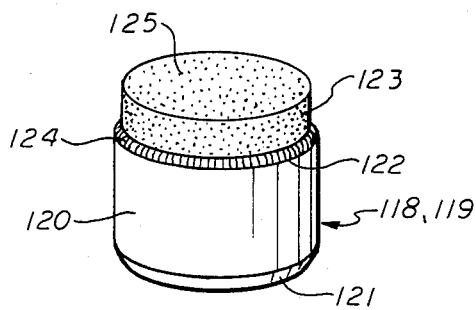
FIG. 6 is an isometric view of one of the diamond bearing elements.
Figure 7:
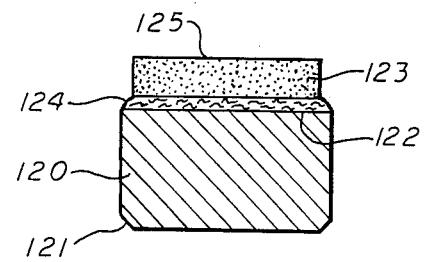
FIG. 7 is a view, in longitudinal central section, of the diamond bearing element shown in FIG. 5.

Stator housing box portion 18 is also provided with a plurality of holes 23 uniformly spaced to provide points for application of pressure to lock ring 22 to permit separtion of stator housing 19 from stator housing sub 11. Details of this feature of construction are shown in FIGS. 6 and 7 of U.S. Pat. No. 4,114,702. Threaded connection 17 is sealed against leakage by "O" ring 24 positioned in groove 25.

The turbine section of the turbodrill is positioned in the stator housing 19 just below the threaded joint 17 connecting to the stator housing sub 11. The stator portion of the turbine consists of a plurality of stator members 26 which are shown in more detail in FIGS. 3, 3A, 4 and 5 of U.S. Pat. No. 4,114,702. The stator members 26 are annular in shape and provided with vanes or blades 27 which are described more fully in said patent. Stator members 26 have an exterior surface providing a sliding fit in the inner surface of stator housing 19 and are positioned as a stack of abutting members extending longitudinally therein. In a typical turbodrill having a 7¾ inch diameter, there are 50 of the stator members made of a hard beryllium copper alloy which is wear-resistant and which has a slightly higher coefficient of expansion than the steel of stator housing 19.

The stack of stator members 26 is maintained under compression in the stator housing 19 with the result that the members are expanded to fit tightly against the inner surface of stator housing 19 and resist slippage therein. Also, because of the higher thermal coefficient of expansion, the stator members 26 tend to expand more at the high temperatures encountered in use of the turbodrill with the result that the increase in temperature encountered during operation causes stator members 26 to fit more tightly within stator housing 19 and effectively prevents slippage therein.

At the upper end of stator housing 19, there is positioned an annular stator spacer 28 which positions the uppermost stator member 26 relative to the end of stator housing sub 11. At the lower end of stator housing 19 there is a box portion 29 which is internally threaded and receives tubular stator makeup sleeve 30 in a threaded joint 31. The lower end of sleeve 30 is notched as indicated at 32 to receive a wrench for tightening sleeve 30 in threaded joint 31.

When stator makeup sleeve 30 is tightened to the position shown, the upper end thereof abuts the lowermost stator member 26 and compresses the entire stack of stator members against each other and against annular stator spacer member 28. Stator makeup sleeve 30 when fully tightened maintains the stack of stator members 26 under sufficient compression to press them tightly against the inner surgace of stator housing 19 and prevents slippage of the stator members during operation as described above.

The lower box end 29 of stator housing 19 is connected in a threaded joint 33 to the threaded upper pin end 34 of bearing pack housing 35. Just below threaded joint 33, there is provided annular groove 21a in bearing pack housing 35 and annular groove 20a in stator housing 19 and a spring lock ring 22a positioned therein to prevent separation of the members accidentally. The lower end of stator housing 19 is provided with holes 23a providing points for application of pressure to lock ring 22a to permit threaded joint 33 to be separated. An "O" ring 24a positioned in groove 25a prevents leakage of fluid through threaded joint 33.

Bearing pack housing 35 extends from threaded joint 33 at its upper end to a lower box end portion 36 which is internally threaded and has a threaded joint 37 with bearing makeup sub 38. At its extreme upper end, bearing pack housing 35 has an interior diameter defining an inner surface 39 which is an extension or projection of the inner surface of stator makeup sleeve 30. A short distance below the upper end of bearing pack 35, the interior diameter thereof is enlarged at beveled surface 40 to surface 41 defining a lubricant chamber which will be subsequently described in more detail. At the lower end of surface 41 defining lubricant chamber, there is a bevel or shoulder 42 opening into a still further enlarged portion having inner surface 43 enclosing the various radial and thrust bearings. Surface 43 terminates in the interior threaded portion at the lower box end 36 of the bearing pack housing.

At the upper end of the turbodrill, inside stator housing 19, there is a rotor shaft 44 which has a generally cylindrical exterior surface 45 terminating at the upper end in threaded portion 46 and at the lower end in threaded portion 47. Rotor shaft 44 has a plurality of rotor members 48 stacked thereon in abutting relationship and blades or vanes 49 vertically aligned with the stator vanes 27.

Stator member 26 comprises an outer sleeve and inner sleeve with vanes or blade members 27 positioned therebetween and uniformly spaced around the periphery thereof. The outer surface of the outer sleeve abuts the inner surface of stator housing 19 securely to prevent slippage of the stator member relative to the housing. The inner surface of the inner sleeve is a smooth bearing surface in which rotor members 48 are guided for smooth rotary motion.

Figure 4:
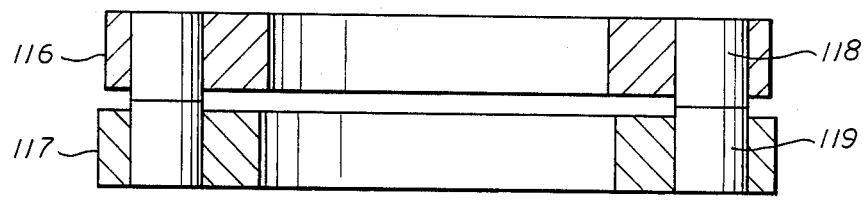
FIG. 4 is an enlarged sectional view of the diamond bearings shown in FIGS. 1C and 3.
Figure 5:
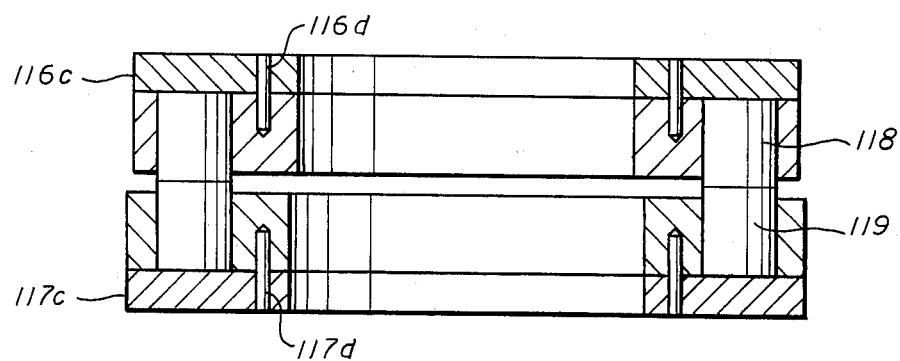
FIG. 5 is an enlarged sectional view of an alternate embodiment of the diamond bearings shown in FIG. 4.

Rotor members 48 comprise hub portions from which blade or vane members 49 extend and a sleeve portion. The exterior surface of the sleeve portion is a smooth bearing surface which fits the inner bearing surface of the inner sleeve of stator member 26. The inner surface of the rotor sleeve and hub is a smooth surface which is provided with a groove or keyway for securing rotor member 48 non-rotatably on rotor shaft 44. In FIGS. 4 and 5 of U.S. Pat. No. 4,114,702, there are shown detail end views of the blade or vane members 49 and 27, respectively. The blade member 49 is shown in substantially enlarged detail. Vane member 49 has an upper end which is the inlet end of the vane for receiving fluid (i.e. mud) and the lower end which is the outlet or exit end for discharge of fluid from the blade or vane. The structure of the vane or blade members 27 of stator 26 is the mirror image of vane or blade members 49 in all details.

Rotor members 48 are positioned on rotor shaft 44 in a stacked relation, as shown in FIG. 1A, with vane or blade members 49 aligned vertically with vane or blade members 27 of stator members 26. Rotor members 48 are positoned on shaft 44 with their keyways aligned with a longitudinally extending groove in rotor shaft 44. A steel wire (not shown) is inserted in the mating grooves of shaft 44 and rotor members 48 to secure the rotor members non-rotatably thereon.

The lower end of the stack of rotor members abuts rotor spacer ring 64 which seats against the upper end 65 of splined connecting members to be subsequently described. At the upper end of rotor shaft 44 there is a cap or makeup screw member 66 which is internally threaded at 67 and forms a tight threaded connection with the threaded end portion 46 of rotor shaft 44. When cap member 66 is tightened in position, its lower end portion 68 abuts the uppermost rotor membr 48 and compresses the stack of rotor members tightly on rotor shaft 44. Cap member 66 is closed at its upper end and has one or more threaded apertures 69 in which there are positioned set screws 70 to secure cap member 66 against loosening during operation.

Upper spline member 71 has an upper end portion 65 abutting rotor spacer ring 64 as previously described. Spline member 71 is internally threaded and forms a threaded connection 72 with the lower end portion 47 of rotor shaft 44. Spline member 71 is hollow and has an exterior surface 73 spaced from the inner surface of stator makeup sleeve 30 to define an annular passageway therebetween. Spline member 71 has a plurality of passages 74 opening into the interior thereof for passage of fluid from the turbine section of the turbodrill. The lower end portion 75 of spline member 71 has a plurality of grooves 77 in the lower or box portion 75 thereof which receive spline pins 78.

A lower spline member 79 has upper pin portion 80 provided with grooves 81 which receive the other side of spline pins 78. Spine member 75 has a peripheral shoulder 82 which receives the lower end of space member 76. The lower or box end 83 of spline member 79 is internally threaded to receive the upper end of bearing shaft 84 in a fitted connection as indicated at 85. A set screw 86 is provided to prevent loosening of threaded joint 85 during operation. Spline member 79 has interior longitudinal passage 87 which opens into the interior longitudinal passage 88 in bearing shaft 84 at the other end. Spline member 71 and 79 and spline pins 78 provide a splined drive connection between rotor shaft 44 and bearing shaft 84.

Bearing shaft 84 is provided with an upper sleeve 89 which abuts the lower end of spline member 79 at its upper end and abuts another bearing shaft sleeve 90 at its lower end. The outer surface of sleeve 89 is spaced from the inner surface 41 of bearing pack housing 35 to define an annular passage 91 in which there are positioned a lubricant grease or oil and a pair of annular-shaped floating piston members 92 and 93, respectively.

Piston member 92 comprises a piston body 94 with chevron-shaped seals 95 on one side and elastic compressible seals 96 on the other side. Seals 95 and 96 are compressed by end cap 97 held in place by a cap screw (not shown). The seal on piston member 92 are of well known design and includes a central spacer member and end spacers which are compressed against the seals by end cap 97.

Piston member 93 is constructed identically to piston member 92 and the detailed parts thereof are not separately identified. Piston members 92 and 93 have a sliding fit in the space between the inner surface 41 of bearing pack housing 35 and the outer surface of sleeve member 89 and have lubricant grease or oil positioned between the piston members and in the space below piston member 93.

The bottom end of lubricant chamber 91 is defined by the upper end surface of housing upset ring spacer 98. At the lower end of lubricant chamber 91 there are provided a pair of openings closed by pipe plugs 99 and 100, which are used for filling the chamber 91 with lubricant.

The lower end of ring spacer 98 is enlarged and has a shoulder portion 101 which abuts the bevel or shoulder 42 on housing 35. The lower end of spacer 98 abuts the upper end of bearing housing spacer 102. The lower end of bearing shaft sleeve 89 abuts spacer sleeve 90. Passageway 103 extends through spacer 98 and bearing housing spacer 102 to permit lubricant flow into the bearing area below. Radial bearings and vertical thrust bearings are positioned below sleeve 90 and spacer 102 and are sealed against lubricant leakage at the bottom of the drill by a radial seal.

The upper radial bearing 104 consists of an outer ring 105 which supports a rubber bearing sleeve 106. A separate bearing ring 107 is positioned on bearing shaft 84 and completes the radial bearing assembly. Rubber bearing sleeve 106 has a plurality of grooves 108 which allow lubricant flow therethrough. Note that the lower radial bearing 104a and components have the same reference numerals as the upper radial bearing with the addition of the suffixes "a" and "b" thereto.

A bearing shaft sleeve 109 is positioned on bearing shaft 84 for rotation therewith and abuts the lower end of bearing ring 107 which is also fitted on bearing shaft 84 for rotation therewith. Ring member 110 is fitted tightly inside housing 35 and has sufficient clearance from sleeve 109 to permit rotation thereof. The upper end of ring 110 abuts the lower end of bearing ring 105 which is also tightly fitted on housing 35. The lower end of ring 110 abuts a plurality of compression springs 111 which are Bellville spring washers. The lower end of the stack of Bellville spring washers 111 fits against a lower supporting spacer ring 112. Below ring 112, there are provided a pair of spacer rings 113 and 114 of self-centering, spherically curved cross section which abut the uppermost vertical thrust bearing 115.

The vertical thrust bearing 115 consists of upper annular bearing plate or ring 116, lower bearing ring 117, and a plurality of diamond bearing elements 118 and 119 spaced equally around the bearing plate/rings. Bearing elements 118 and 119 are preferably diamond cutting elements, e.g. STRATAPAX cutters manufactured by General Electric Co. and described in Daniels, et al. U.S. Pat. No. 4,156,329, Rowley, et al. U.S. Pat. No. 4,073,354 and in considerable detail in ADVANCED DRILLING TECHNIQUES by William C. Maurer.

Bearing elements 118 and 119 are press fitted in supporting plates 116 and 117 and ground flush with the back side of the plates. In the embodiment of FIG. 5, bearing elements 118 and 119 are additionally secured by retaining plates 116c and 117c secured to the supporting plates by pins 116d and 117d. Supporting plates 116 and 117 are sized so that one has a larger O.D. than the other so that the larger fits the outer housing and has a larger I.D. to clear the rotor shaft. The other plate has a smaller I.D. to fit on the rotor shaft for rotation therewith and a smaller O.D. to clear the outer housing to permit it to rotate.

The STARTAPAX cutting elements 118 and 119, used herein as bearings, each consists of a cylindrical supporting stud 120 of sintered carbide. Stud 120 is beveled at the bottom as indicated at 121 and has a flat top end surface 122 which is normal to the axis of the cylindrical stud. A disc shaped cutting or bearing element 123 is bonded on top end surface 122, preferably by brazing or the like as indicated at 124. Disc shaped bearing element 123 is a sintered carbide disc having a flat bearing surface 125 comprising polycrystalline diamond. Supporting studs 120 of bearing elements 118 and 119 have a tight interference fit in recesses in bearing plate/rings 116 and 117.

The lower thrust bearings, described below, are constructed identically to the upper thrust bearings and have the same reference numerals with the addition of the suffix "a". The bearing elements 118 and 119 are of a size and sufficient in number around the bearing plate/rings 116 and 117 so than each bearing element is wider that the circumferential distance between adjacent bearing elements. In addition, there is preferably one more of the bearing elements on one of the bearing plate/rings 116 or 117 which assures that most of the bearing elements are overlapping most of the time.

Upper bearing plate/ring 116 fits tightly against housing 35 and has a clearance relative to sleeve 109 so that it remains stationary relative to the housing. Lower bearing plate/ring 117 has a tight fit on sleeve 109 and a clearance relative to the inner wall surface of housing 35 so that it is fixed relative to shaft 84 and rotates therewith.

The diamond bearing elements 118 and 119 therefore are in a position of relative bearing movement and constitute the sole bearing surfaces supporting longitudinal thrust loads in the drilling tool. The diamond surfaces of elements 118 and 119 are highly resistant to wear, even in the presence of drilling mud, and the bearings have much longer life than other types of roller or friction bearings.

A thrust bearing spacer ring 126 is fitted tightly on bearing shaft 84 and has a clearance relative to housing 35. The lower end of spacer 126 abuts bearing shaft sleeve 117. The lower end of spacer 126 also abuts the upper ring of the lower vertical thrust bearing 115a.

The lower vertical thrust bearing 115a consists of upper ring 117a which fits tightly on bearing shaft sleeve 127 and has a small clearance relative to the inner surface of housing 35. There is also provided lower bearing ring 116a. A plurality of diamond bearing elements 118a and 119a are equally spaced and secured in place around bearing plate/rings 116a and 117a as described above for the upper thrust bearing 115. Lower bearing ring 116a fits tightly inside housing 35 and has a slight clearance relative to bearing shaft sleeve 117.

Immediately below the bearing ring 116a are a pair of spacer rings 114a and 113a of spherical cross section, for self centering, which bear against spacer ring 112a. Below ring 112a are a plurality of compression springs 111a which are Bellville spring washers. The lower end of the stack of Bellville spring washers 111a abut spacer ring 110a.

Below ring member 110a and sleeve 127 there is positioned the intermediate radial bearing 104a. This bearing consists of outer bearing ring 105a which supports a rubber bearing sleeve 106a. A separate bearing ring 107a is positioned on bearing shaft 84 and completes the radial bearing assembly 104a. Rubber bearing sleeve has a plurality of grooves 108a which allow lubricant flow therethrough.

Below the intermediate radial bearing 104a, there is positioned bearing spacer 130 which fits tightly within the bearing housing 35. There is also positioned bearing shaft upset spacer ring 131 which has a shoulder 132 which has a small clearance from shoulder 133 on the bearing shaft. Space between spacers 130 and 131 is sufficient for passage of lubricant to the lower radial bearing.

Spacers 130 and 131 abut the upper end portions of the lowermost radial bearing 104b. This bearing consists of outer bearing ring 105b which supports a rubber bearing sleeve 106b. A separate bearing ring 107b is positioned on bearing shaft 84 and completes the radial bearing assembly 104b. Rubber bearing sleeve has a plurality of grooves 108b which allow lubricant flow therethrough. Outer ring 105b is tightly fitted inside housing 35 and inner bearing ring 107b is fitted on bearing shaft 84 for rotation therwith.

At the lower end of housing 35, bearing makeup sub 38 is tightened against the lower end of bearing ring 105b of the lowermost radial bearing 104b. On trhe bearing shaft 84, there is positioned bearing seal sleeve 137 which, at its upper end, abuts the lower end of bearing ring 107b and at its lower end abuts bearing shaft end ring 138 which is fitted on shoulder 139 of the enlarged lower end 140 of the bearing shaft. Bearing makeup sub 138 is secured against separation of its threaded connection by cooperating grooves 20b and 21b enclosing lock ring 22b. Holes 23b provide for application of pressure for release of lock ring 22b. Sub 38 is also provided with a peripheral grove 24b in which there is positioned an "O" ring seal 25b.

A dynamic radial seal 143 is provided between sub 38 and seal sleeve 137 to prevent loss of lubricant from the bearings. The seal may be a chevron-type seal or other suitable seal for rotating parts, as in U.S. Pat. No. 4,114,702. Upper spacer member 141 and 142 are positioned between lower radial bearing 104b and radial seal 143. Spacer ring 144 is positioned between the lower end of radial bearing seal 143 and shoulder 145 at the lower end of sleeve 38.

The lower enlarged end portion 140 of bearing shaft 84 is threaded internally as indicated at 148. This threaded opening receives and secures in place the hollow connector sub 149 of drill bit 150. The turbodrill is illustrated as driving a rotary-type drill bit 150. It should be understood, however, that any suitable drill bit could be used of the various types used with conventional drills utilizing various types of down-hole motors. In particular, the turbodrill is particularly useful with solid head diamond bits as is illustrated in Fox U.S. Pat. No. 3,971,450.

OPERATION

The turbodrill is assembled as illustrated in FIGS. 1A, 1B, 1C, and 1D. Except for the bearing section, this turbodrill is substantially the same as the turbodrill shown in U.S. Pat. Nos. 4,114,702; 4,114,703 and 4,114,704. The housing is in several sections, as described above, and is threadedly connected at several points. Since the turbodrill housing is held stationary and the drill is driven at high speed there are substantial torques placed upon the threaded joints which tend to cause those joints to unscrew.

In the past, threaded joints have been protected against unscrewing by use of set screws. However, set screws sometimes come loose and the desired protection for the threaded joint may not be obtained. In this construction, the threaded joints are protected by a lock ring arrangement which is shown in use for several threaded connections. When threaded connection 33 is made, the housing 29 slides past lock ring 22a until grooves 20a and 21a reach a mating relation, at which point, lock ring 22a springs into the position indicated locking the parts together to prevent separation of the thread. The lock ring may be compressed to permit the joint to be unscrewed using a suitable tool such as that shown in FIG. 7 of U.S. Pat. No. 4,114,702.

During assembly of the apparatus a suitable lubricant grease or oil, which will withstand the temperatures normally encountered by the turbodrill, is introduced through the lower opening 100, after unplugging the same, to fill the lower portion of the turbodrill with lubricant. The lubricant introduced through opening 100 fills and completely surrounds the bearings and the radial seals. Lubricant is also introduced through opening 99, after unplugging the same to fill the space above piston 93 and cause piston 92 to rise above it. Sufficient lubricant is introduced to cause the pistons to be positioned substantially as shown in full line in FIGS. 1B and 1C. The holes 99 and 100 are plugged to prevent loss of lubricant.

When the turbodrill is connectd to drill string 14 as shown in FIG. 1A, drilling mud is pumped through the drill string at a high rate of flow and through the turbodrill. The drilling mud flows through passage 15 into the annular space at the upper end of the turbine section. The drilling mud flows through each of the turbine stages causing the turbine to rotate at a high speed. The drilling mud flows past each of the vanes 27 of the stator members 26 and is directed from those vanes at a high viscosity against vanes 49 of rotor members 48.

The shape of the vanes, particularly the exit angle, is designed to create a maximum thrust on the rotor members and a maximum torque on the rotor shaft 44 as the drilling mud is pumped through the turbine section. As indicated above, a large number of turbine elements make up the turbine section. In a typical 7¾ inch turbodrill, there are fifty sets of stator members and fifty sets of rotor members, which results in the production of a high torque and a high speed of turning of the rotor shaft 44.

The rotor shaft 44 which is turning at a high rate of speed is connected by a splined connection, as described above, to bearing shaft 84. The drilling mud flows from the turbine section the the annular space around the splined connection and through the passage in the middle of the splined connection into the hollow passage 88 extending through the bearing shaft to the exterior of the drill where the mud is discharged through the drill bit (whether a rotary bit or a solid head bit) and then flows back up the hole being drill to remove cuttings from the hole. The drill mud flows at least partly around the splined connection at the top of the bearing shaft and applies a hydraulic force against the upper end of piston 92.

The piston 92 is therefore maintained under a high hydrostatic pressure of drilling mud which is flowing through the turbodrill. The pressure on piston 92 presses against the lubricant in the space below the piston 93 and lubricant around the bearings and radial seal under a substantial hydrostatic pressure. In the past, floating pistons have been used to pressurize lubricant systems in turbodrill. However, drilling mud has eventually eroded the pistons and penetrated into the bearing and sealing areas which resulted in the destruction of the working parts of the turbodrill. In this construction, the double piston arrangement with lubricant providing a hydraulic fluid between the pistons protects the lower piston against contamination by the drilling mud and provides protection and greater life for the seal.

In the operation of the turbodrill, the design of bearings and of seals is of critical importance. The bearings and the seals in prior art turbodrills are the points where the highest incidence of failure has occurred. The radial bearings are not a major problem in that the radial loads are much smaller than the thrust loads and the space constraints are not so great as on the radial bearings. As described above, rubber bearings 104, 104a and 104b are used herein.

In this turbodrill the vertical thrust bearings 115 and 115a are an important feature of construction. There are two sets of thrust bearings used. The upper thrust bearings 115 carry the upper thrust produced during drilling. The lower thrust bearings 115a carry the load produced when the motor is rotated off bottom. The improved thrust bearings described above are diamond thrust bearings in the form of Statapax inserts 118 and 119 supported on two annular plates or rings 116 and 117. These bearing inserts 118 and 119 have flat bearing faces 125 of polycrystalline diamond, have exceptionally long wearing life, and will carry substantial longitudinal loads.

As noted above, in prior art types of turbodrills, the seals in the bearing section and the lubrications system are of substantial importance. The bearings in prior art turbodrills have had very short lives because they operated under direct exposure to the drilling mud. In one embodiment of this turbodrill, the entire bearing section is operated with a sealed lubrication system where the oil or grease is pressurized by floating pistons as previously described. The seals which prevent the loss lubricant from the bearing section are important. The prior art drills which have attempted to use sealed lubricant systems have generally used packing type seals or compressed rubber seals which in many cases apply such high forces to the bearing shaft as to make it difficult to rotate. In this turbodrill, the rotary seal for the bearings is a multiple chevron-type seal, or equivalent rotary seal, which prevents loss of lubricant, prevents intrusion of drilling mud to the bearings, thus, increasing substantially the life of the bearings and of the drill. However, even if there is leakage of drilling mud into the bearings the polycrystalling bearing surfaces are not adversely affected.

It is also possible to use the diamond bearings described above in modifications of this turbodrill in which the seals and lubrication system are eliminated and the mud allowed to flow through both the radial and the thrust bearings. Such a construction allows the turbodrill to be shortened considerably in length. The diamond bearings used in this turbodrill are bearings which may have application in other apparatus where bearings must function under high load and/or in an abrasive environment. The diamond bearings are therefore considered to be of general application.

While this invention has been described fully and completely with special emphasis upon several preferred embodiments, it should be understood that other equivalent means of carrying out the inventive features may be utilized without departing from the scope and intent of coverage of this invention.

I claim:

1. A down hole well drilling tool adapted for connection at one end to the lower end of a drill string and at the other end to a drill bit to be driven thereby, comprising tubular housing means and rotary shaft means supported therein and extending therefrom and adapted to support a drill bit, motor means in said housing means actuated by flow of drilling fluid therethrough and operable to rotate said shaft means, bearing means in said housing means supporting said rotary shaft means, lubricating means for said bearing means, in which said bearing means comprises a radial bearing having one bearing member supported on said housing and another bearing member supported on and rotatable with said rotary shaft means, an annular thrust bearing for vertical or longitudinal thrust loads comprising a first bearing member supported on said housing and a second bearing member supported on and rotatable with said rotary shaft means, said first thrust bearing member comprising a first annular supporting plate, a plurality of insert members equally spaced around said first annular plate, extending longitudinally of said tool and having flat co-planar continuous polycrystalline diamond bearing surfaces extending above the surface of said first annular plate, said second thrust bearing member comprising a second annular supporting plate, and a plurality of insert members equally spaced around said first annular plate, extending longitudinally of said tool toward said first annular plate and having flat co-planar continuous polycrystalline diamond bearing surfaces extending below the surface of said second annular plate and engaging said first named insert bearing members along a common plane for bearing movement thereagainst.

2. A down hole well drilling tool according to claim 1 in which said one radial bearing member comprises a rubber sleeve bearing, and said other radial bearing member comprises a metal bearing sleeve.

3. A down hole well drilling tool according to claim 1 in which said diamond bearing faces comprise polycrystalline diamond.

4. A down hole well drilling tool according to claim 1 in which said first named and second named insert members comprise cylindrical hardmetal studs, and said co-planar diamond bearing surfaces comprise polycrystalline diamond discs secured thereon.

5. A down hole well drilling tool according to claim 4 in which the plurality of inserts on one of said annular supporting plates is different in number from the plurality of inserts on the other annular supporting plate.

6. A down hole well drilling tool according to claim 4 in which said inserts are supported in the respective annular supporting plates in cylindrical passages therein by an interference fit and ground off smooth on the back side of the respective supporting plates.

7. A down hole well drilling tool according to claim 6 in which an annular backing plate is secured to the back side of each of said supporting plates to provide thrust support for said bearing inserts.

8. A bearing pack for a down hole well drilling tool comprising a bearing housing adapted to be connected to the housing of a well-drilling, fluid-actuated downhole motor, a rotary bearing shaft positioned in said bearing housing having one end adapted to support a drill bit and another end adapted to be driven with a rotary shaft of a well drilling fluid actuated down hole motor when assemble thereon, bearing means in said bearing housing supporting said bearing shaft, lubricating means for said bearing means, in which said bearing means comprises a radial bearing having one bearing member supported on said housing and another bearing member supported on and rotatable with said rotary shaft means, a thrust bearing for vertical or longitudinal thrust loads comprising a first bearing member supported on said housing and a second bearing member supported on and rotatable with said rotary shaft means, said first thrust bearing member comprising a first annular supporting plate, a plurality of insert members equally spaced around said first annular plate, extending longitudinally of said tool and having flat co-planar continuous polycrystalline diamond bearing surfaces extending above the surface of said first annular plate, said second thrust bearing member comprising a second annular supporting plate, and a plurality of insert members equally spaced around said first annular plate, extending longitudinally of said tool toward said first annular plate and having flat co-planar continuous polycrystalline diamond bearing surfaces extending below the surface of said second annular plate and engaging said first named insert bearing members along a common plane for bearing movement thereagainst.

9. A bearing pack according to claim 8 in which said one radial bearing member comprises a rubber sleeve bearing, and said other radial bearing member comprises a metal bearing sleeve.

10. A bearing pack according to claim 9 in which said first named and said second named insert members comprise cylindrical hardmetal studs, and said co-planar diamond bearing surfaces comprise polycrystalline diamond discs secured thereon.

11. A bearing pack according to claim 10 in which the plurality of inserts on one of said annular supporting plates is different in number from the plurality of inserts on the other annular supporting plate.

12. A bearing pack according to claim 10 in which said inserts are supported in the respective annular supporting plates in cylindrical passages therein by an interference fit and ground off smooth on the back side of the respective supporting plates.

13. A bearing pack according to claim 10 in which an annular backing plate is secured to the back side of each of said supporting plates to provide thrust support for said bearing inserts.

14. A rotary thrust bearing structure comprising
a tubular outer member,
an inner member supported in said outer member for relative movement of said members,
bearing means in said outer member supporting said inner member,
said bearing means comprising a thrust bearing for vertical or longitudinal thrust loads comprising a first bearing member supported on said outer member and a second bearing member supported on said inner member permitting relative rotational movement therebetween,
said first thrust bearing member comprising a first annular supporting plate,
a plurality of insert members equally spaced around said first annular plate, extending longitudinally of said tool and having flat co-planar continuous polycrystalline diamond bearing surfaces extending above the surface of said first annular plate,
said second thrust bearing member comprising a second annular supporting plate, and
a plurality of insert members equally spaced around said first annular plate, extending longitudinally of said tool toward said first annular plate and having flat co-planar continuous polycrystalline diamond bearing surfaces extending below the surface of said second annular plate and engaging said first named insert bearing members along a common plane for bearing movement thereagainst.

15. A rotary thrust bearing structure according to claim 14 in which
said first named and said second named insert members comprise cylindrical hardmetal studs, and
said co-planar diamond bearing surfaces comprise polycrystalline diamond discs secured thereon.

16. A rotary thrust bearing structure according to claim 19 in which
the plurality of inserts on one of said annular supporting plates is different in number from the plurality of inserts on the other annular supporting plate.

17. A rotary thrust bearing structure according to claim 15 in which
said inserts are supported in the respective annular supporting plates in cylindrical passages therein by an interference fit and ground off smooth on the back side of the respective supporting plates.

18. A rotary thrust bearing structure according to claim 17 in which
an annular backing plate is secured to the back side of each of said supporting plates to provide thrust support for said bearing inserts.

* * * * *